US010718928B2

United States Patent
Chen et al.

(10) Patent No.: US 10,718,928 B2
(45) Date of Patent: Jul. 21, 2020

(54) OPTICAL LENS AND FABRICATION METHOD THEREOF

(71) Applicant: Young Optics Inc., Hsinchu (TW)

(72) Inventors: Wen-Zhou Chen, Hsinchu (TW); You-Ting Huang, Hsinchu (TW); Chao-Shun Chen, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 151 days.

(21) Appl. No.: 15/955,112

(22) Filed: Apr. 17, 2018

(65) Prior Publication Data

US 2019/0146180 A1  May 16, 2019

(30) Foreign Application Priority Data

Nov. 14, 2017  (TW) .................................. 106139339

(51) Int. Cl.
  *G02B 7/08*   (2006.01)
  *G02B 7/10*   (2006.01)
  *G02B 15/14*  (2006.01)

(52) U.S. Cl.
  CPC ............ *G02B 7/102* (2013.01); *G02B 15/14* (2013.01)

(58) Field of Classification Search
  CPC ... G02B 7/08; G02B 7/09; G02B 7/04; G03B 3/10; H04N 5/2254
  USPC ....................................................... 359/824
  See application file for complete search history.

(56) References Cited

U.S. PATENT DOCUMENTS

| 5,177,638 | A | * | 1/1993 | Emura | ..................... G02B 7/10 |
| | | | | | 359/704 |
| 6,704,504 | B2 | * | 3/2004 | Miyazaki | ............... G02B 7/102 |
| | | | | | 396/133 |
| 7,309,932 | B2 | | 12/2007 | Tseng | |
| 2002/0047408 | A1 | | 4/2002 | Tanaka | |
| 2012/0169902 | A1 | * | 7/2012 | Matsuzawa | .......... H04N 5/2254 |
| | | | | | 348/239 |
| 2014/0313390 | A1 | * | 10/2014 | Uemura | ............... G02B 23/105 |
| | | | | | 348/335 |
| 2018/0164532 | A1 | * | 6/2018 | Wei | ......................... G02B 7/021 |

FOREIGN PATENT DOCUMENTS

TW  M304688 U  1/2007

* cited by examiner

*Primary Examiner* — Mohammed A Hasan
(74) *Attorney, Agent, or Firm* — Muncy, Geissler, Olds & Lowe, PC

(57) ABSTRACT

On embodiment of the invention provides an optical lens includes a lens barrel, a first lens group and a photo interrupter disposed in the lens barrel, a light-shading sheet and a power machine. The photo interrupter has an optical transmitter and an optical receiver, the optical transmitter emits a light beam in a first direction, and the optical receiver receives the light beam. The light-shading sheet is disposed in a propagation path of the light beam and has two shading parts with mutually different lengths. The power machine is linked to a kinetic machine part, and the kinetic machine part is connected to the first lens group.

20 Claims, 6 Drawing Sheets

OPTICAL LENS AND FABRICATION METHOD THEREOF

BACKGROUND OF THE INVENTION a. Field of the Invention

The invention relates to an optical lens and a fabrication method of the optical lens.

b. Description of the Related Art

Nowadays, a camera with a zoom lens for which the focal length can be adjusted according to actual demands is widely used. As shown in FIG. 1, a photo interrupter 102 is disposed in a zoom lens 100, and an electric current flowing through a phototransistor of the photo interrupter 102 may vary when a light-blocking flag 104 crosses the photo interrupter 102 of the zoom lens 100. Therefore, a light-blocking state and a light-transmitting state can be alternately formed to detect the position of a moveable lens group of the zoom lens 100. According to the above design, each time the zoom lens begins to operate, the photo interrupter 102 needs to be located in an initial position before motor steps are calibrated. This, however, may increase the risk of out-of-step or colliding with mechanical limits as a result of backlash or optical detection errors.

BRIEF SUMMARY OF THE INVENTION

According to one aspect of the present disclosure, an optical lens includes a lens barrel, a first lens group and a photo interrupter disposed in the lens barrel, a light-shading sheet and a power machine. The photo interrupter has an optical transmitter and an optical receiver, the optical transmitter emits a light beam in a first direction, and the optical receiver receives the light beam. The light-shading sheet is disposed in a propagation path of the light beam and has two shading parts with mutually different lengths. The power machine is linked to a kinetic machine part, and the kinetic machine part is connected to the first lens group.

According to another aspect of the present disclosure, an optical lens includes a lens barrel, a first lens group disposed in the lens barrel, a waveform generator, a processor and a power machine. The waveform generator generates a first pulse signal and a second pulse signal, and a pulse width of the second pulse signal is smaller than a pulse width of the first pulse signal. The processor is electrically connected to the waveform generator and receives the first pulse signal and the second pulse signal of the waveform generator to detect a current position of the first lens group, and the power machine moves the first lens group.

According to the above embodiments, two shading parts having mutually different lengths are provided on a single element to correspondingly form a light-blocking state and a light-transmitting state and allow the photo interrupter to have different lengths of interrupt time. Therefore, an initial position for focus adjustment, different positions of motion of a lens group, and a range for focus adjustment can be precisely detected according to the pulse signals of the photo interrupter to decrease the risk of out-of-step or colliding with mechanical limits as a result of backlash or optical detection errors. Besides, the arrangement of shading parts may vary according to actual demands to adjust positioning precision, a focus adjustment range for an optical lens, or a moving trace of a kinetic machine part.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

Figure 1:
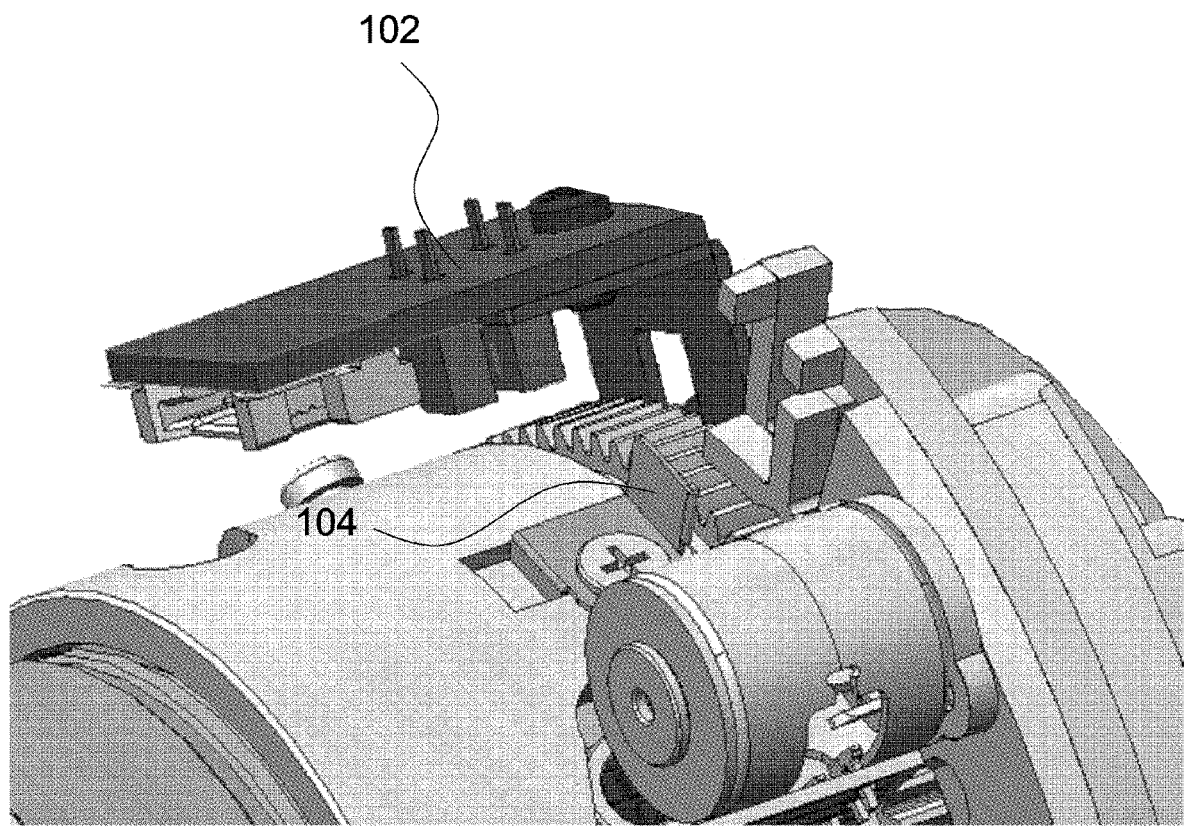
FIG. 1 shows a schematic diagram of a conventional zoom lens.
Figure 2:
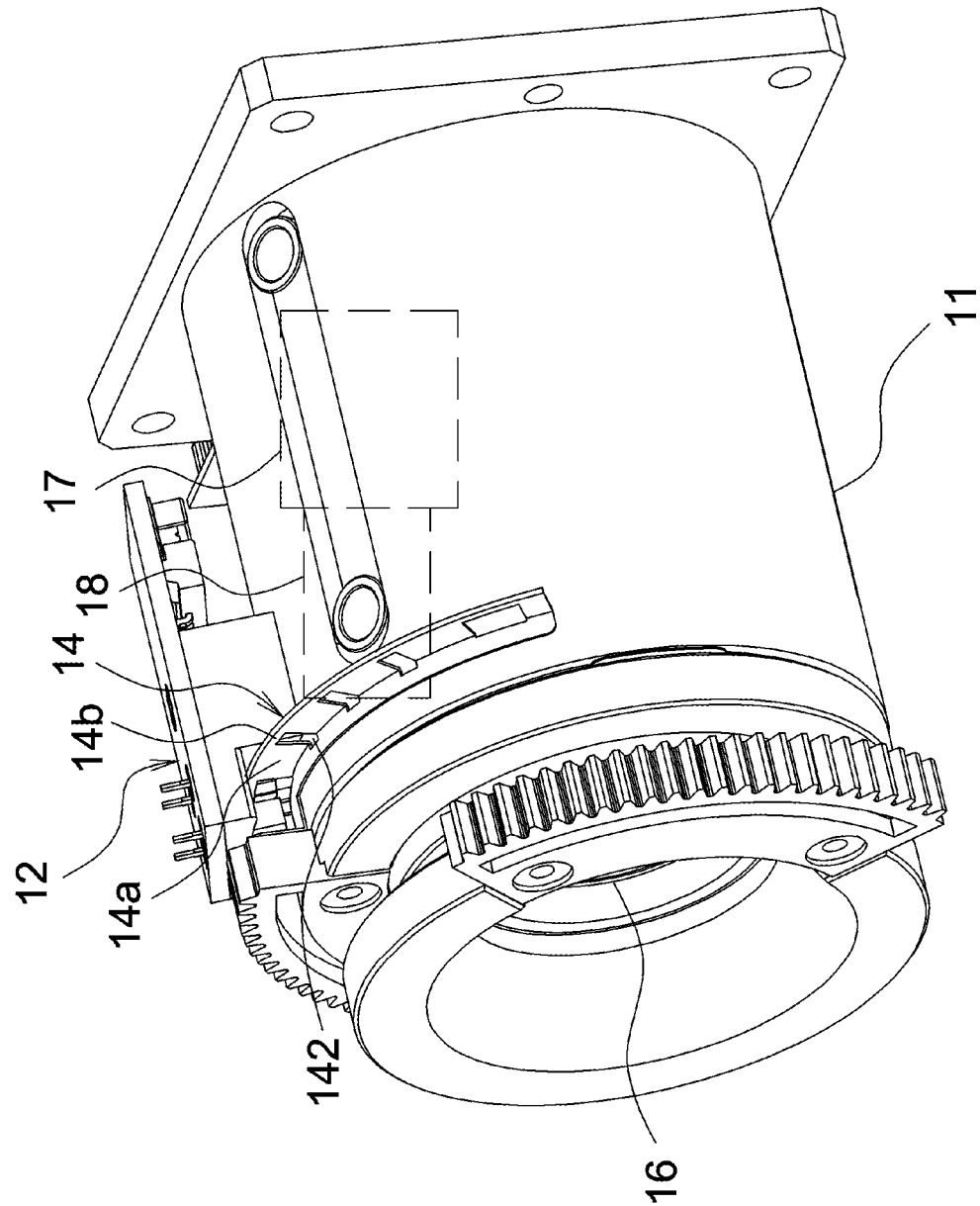
FIG. 2 shows a schematic diagram of an optical lens according to an embodiment of the invention.
Figure 3:
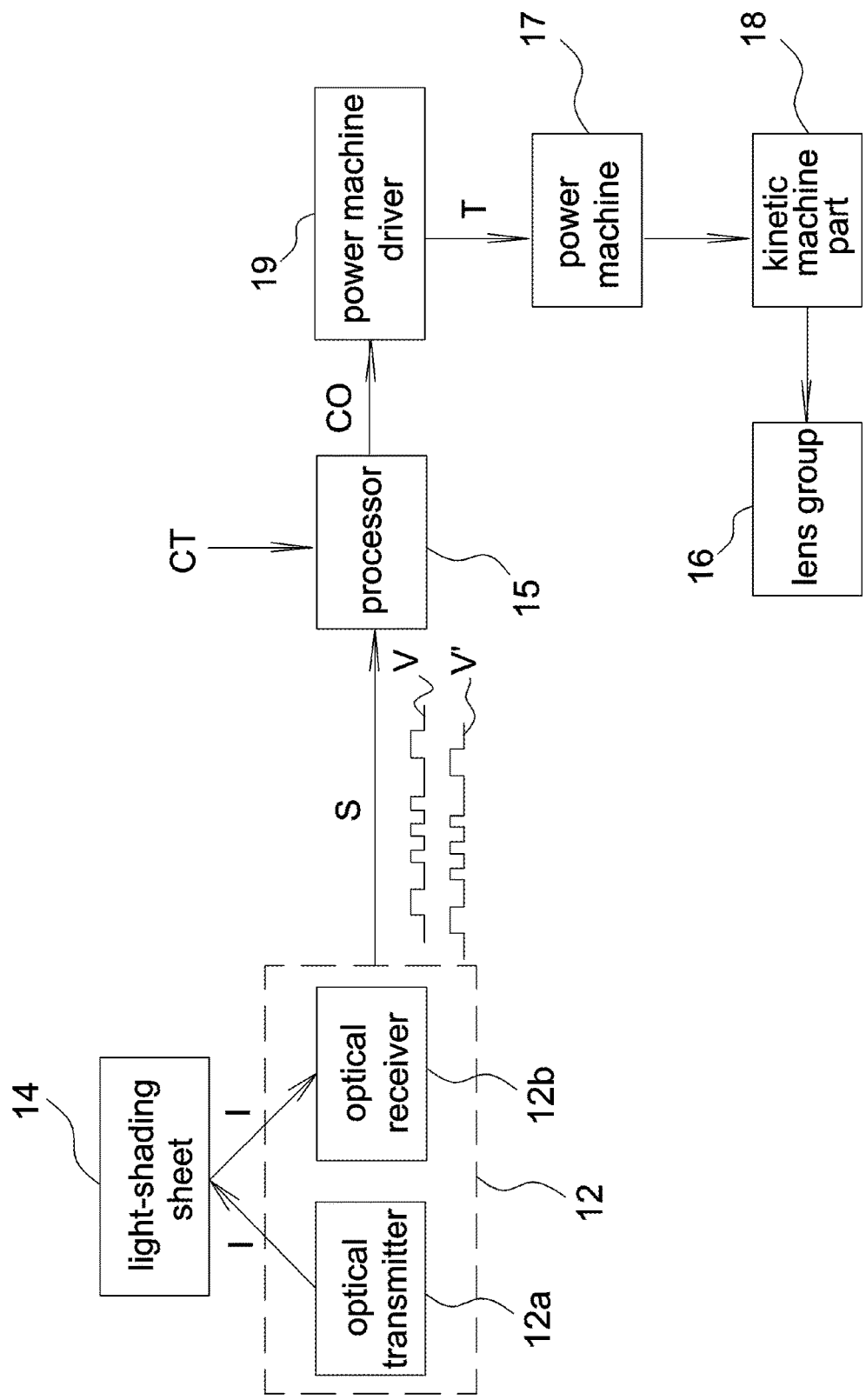
FIG. 3 shows a block diagram illustrating operations of the optical lens shown in FIG. 2.

FIG. 2 shows a schematic diagram of an optical lens according to an embodiment of the invention. Referring to FIG. 2, an optical lens 10 includes a lens barrel 11, a photo interrupter 12, a light-shading sheet 14, a lens group 16, a power machine 17 and a kinetic machine part 18. The lens group 16 is disposed in the lens barrel 11, the power machine 17 is linked to the kinetic machine part 18, and the kinetic machine part 18 is connected to the lens group 16. The lens group 16 may be, but is not limited to, a zooming lens group or a focusing lens group. The kinetic machine part 18 may be directly connected to the lens group 16 or indirectly connected to the lens group 16 via other component. The power machine 17 may mechanically or magnetically drive the lens group 16, but the invention is not limited thereto. An embodiment of a mechanically drive scheme is described in the following. For example, the power machine 17 may be a stepper motor, and one end of the lens group 16 is connected to a connection machine part. The connection machine part may be a clip, and the kinetic machine part 18 may be a threaded rod. The threaded rod is held on with the clip and rotated by the stepper motor 17 to move the lens group 16. The connection machine part is capable of linking multiple machine parts and may be a clip, bolt, pin, key, rivet, etc. The kinetic machine part is capable of transmitting kinetic energy or changing force excretion directions and may be a threaded rod, friction wheel, gear, cam, pulley wheel, rope wheel, sprocket, coupler, axle, pulley, rope, chain, etc. Further, an embodiment of a magnetically drive scheme is described in the following. The power machine may be a voice coil motor (VCM) where a direct current flowing through coils therein under a permanent magnetic field may vary in magnitude to control stretching positions of a spring sheet and force the lens group to move. The permanent magnetic field may be induced by a permanent magnet or other magnetic material such as a magnetic alloy or steel sheet. The light-shading sheet 14 is disposed in a propagation path of a light beam emitted by the photo interrupter 12 and has two shading parts 14a and 14b with different lengths. In this embodiment, the light-shading sheet 14 is a sheet member having multiple openings 142. The shading part 14a having a comparatively longer length is formed in a position of the light-shading sheet 14 without the opening 142, and the shading part 14b having a comparatively shorter length is formed in a position of the light-shading sheet 14 provided with the opening 142. Please also refer to FIG. 3, in this embodiment, an optical transmitter 12a of the photo interrupter 12 emits a light beam I in a direction, and the light beam I is reflected by the light-shading sheet 14 and then received by an optical receiver 12b. In this embodiment, the light beam I impinging upon the shading part 14a having a longer length forms a light-blocking state, and the light beam I impinging upon the shading part 14b having a shorter length forms a light-transmitting state. The photo interrupter 12 outputs a signal S after receiving the light beam I, and the signal S may include a normal signal V and a delay signal V' each corresponding to the light-blocking state and the light-transmitting state. A processor 15 is electrically connected to the photo interrupter 12 and receives a signal S to detect a current position of the lens group 16. Further, the processor 15 may receive an initialization command CT to decide a moving direction of the lens group 16 and output a control command CO according to the initialization command CT. A power machine driver 19 is electrically connected to the power machine 17 and the processor 15, and the power machine driver 19 receives the control command CO of the processor 15 to output a signal T. The power machine 17 receives the signal T of the power machine driver 19 to move the lens group 16 by the kinetic machine part 18.

Figure 4:
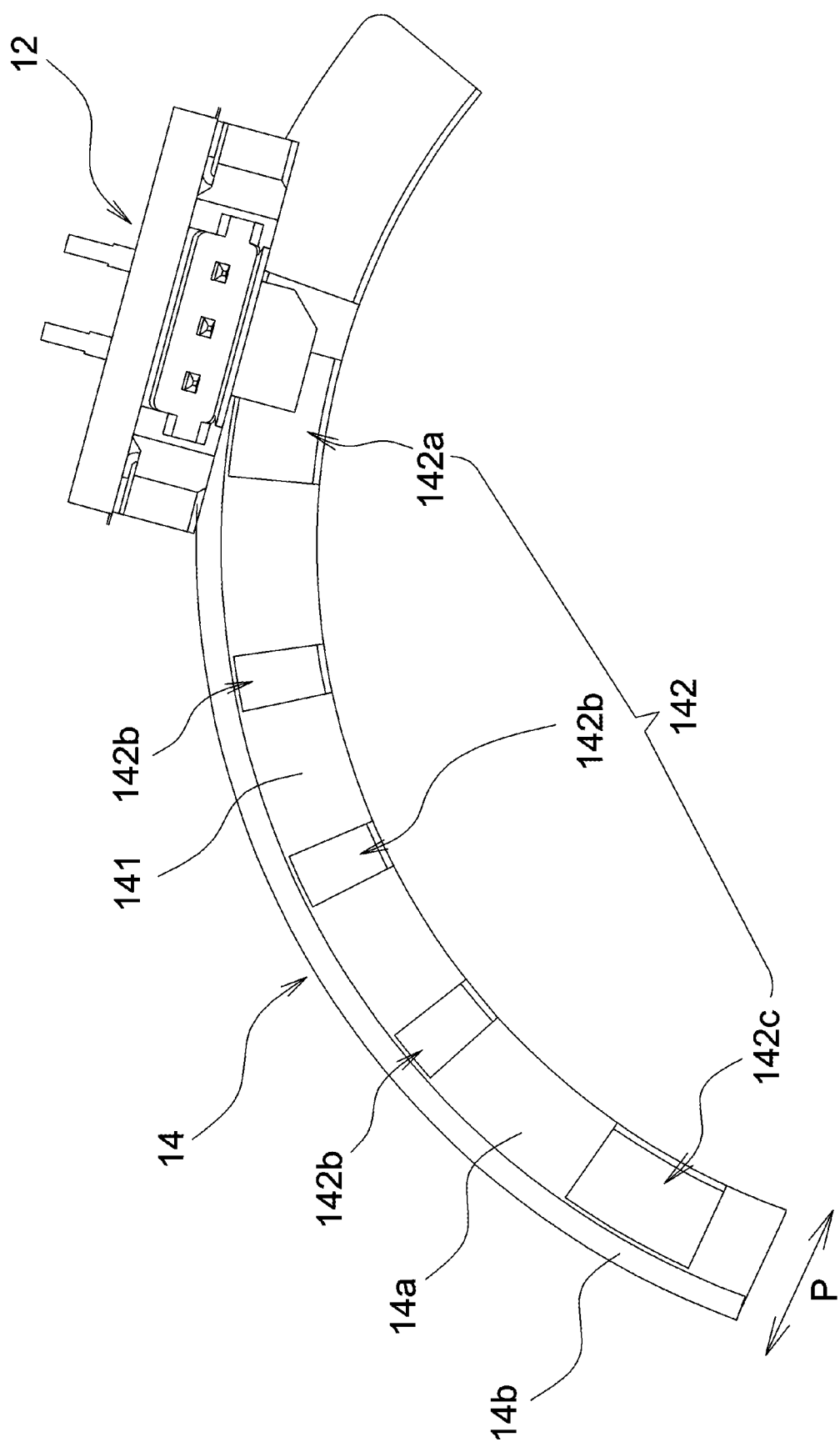
FIG. 4 shows a schematic diagram of a light-shading sheet according to an embodiment of the invention.
Figure 5:
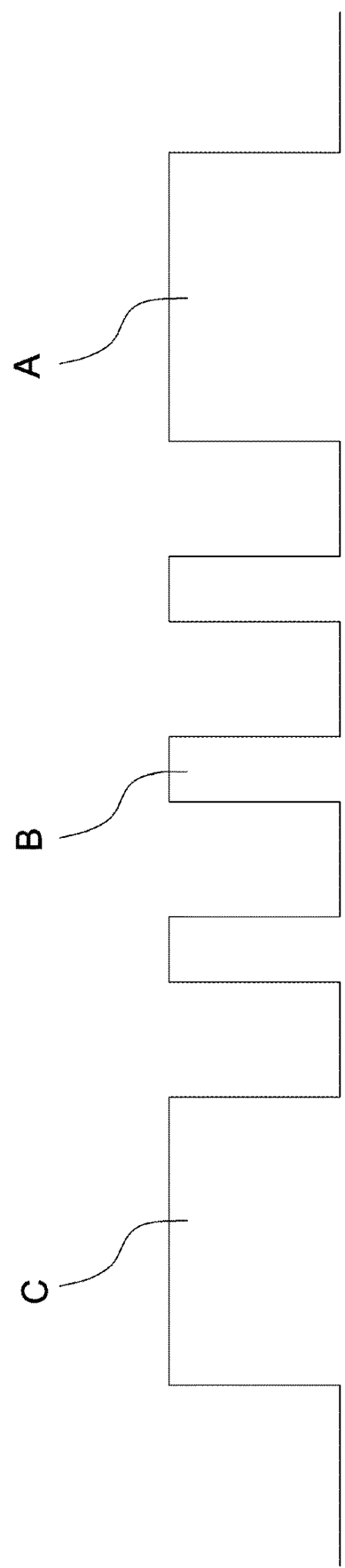
FIG. 5 shows a diagram illustrating pulse signals with different pulse widths according to an embodiment of the invention.

FIG. 4 shows a schematic diagram of a light-shading sheet according to an embodiment of the invention. In this embodiment, the light-shading sheet 14 is a sheet member 141 having multiple openings 142. The sheet member 141 has two shading parts 14a and 14b that have different lengths and are distinguished from each other by the formation of the opening 142. In this embodiment, the length of the light-shading parts 14a and 14b is a shielding length measured in a direction P substantially perpendicular to a tangential motion direction of the light-shading sheet 14. The multiple openings 142 may include a first opening 142a, multiple second openings 142b and a third opening 142c. The second openings 142b are disposed between the first opening 142a and the third opening 142c. In this embodiment, the configuration of each of the first opening 142a and the third opening 142c is different to that of the second openings 142b, and the first opening 142a and the third opening 142c have an identical configuration. For example, the first opening 142a and the third opening 142c may have an identical larger diameter, and each second openings 142b may have a comparatively smaller diameter. Therefore, when the light-shading sheet 14 moves relative to the photo interrupter 12, the larger first opening 142a or third opening 142 crossing the photo interrupter 12 may induce a larger electric current flowing through a phototransistor to generate a pulse signal A or a pulse signal C having a larger pulse width, as shown in FIG. 5. In comparison, each smaller second opening 142b crossing the photo interrupter 12 may induce a smaller electric current flowing through the phototransistor to generate a pulse signal B shown in FIG. 5 having a smaller pulse width. Therefore, the light-shading sheet 14 is allowed to cause different lengths of interrupt time for the photo interrupter 12, and the photo interrupter 12 may serve as a waveform generator to generate pulse signals with different pulse widths. Herein, the term "pulse signal" refers a voltage or current signal having characteristics of rapid, transient and intervallic changes in the amplitude, and the term "pulse width" refers to a duration time of a high level in the pulse signal. In one embodiment, the first opening 142a may correspond to an initial position of the optical lens 10 for focus adjustment. In that case, whether the optical lens 10 and the light-shading sheet 14 disposed therein are in the initial position can be detected by recognizing the pulse signal A corresponding to the first opening 142a. Further, multiple pulse signals B may correspond to different locations of a path along which the lens group 16 moves. Therefore, a current position of the lens group 16 relative to the initial position can be detected by recognizing each pulse signal B that has a different configuration compared with the pulse signal A. Besides, an interval between two adjacent second openings 142b or dimensions of the second openings 142b can be adjusted according to actual demands to increase sensing precision. In this embodiment, all shading parts 14a and 14b are arranged at regular intervals, but the invention is not limited thereto. Further, in this embodiment, the first opening 142a and the third opening 142c respectively corresponds to two end points of a focus adjustment range (initial and final positions). Therefore, a maximum range for focus adjustment of the optical lens 10 can be defined by detecting the pulse signal A (correspond to the first opening 142a) and the pulse signal C (correspond to the third opening 142c).

According to the above embodiments, two shading parts having mutually different lengths are provided on a single element to correspondingly form a light-blocking state and a light-transmitting state and allow the photo interrupter to have different lengths of interrupt time. Therefore, an initial position for focus adjustment, different positions of motion of a lens group, and a range for focus adjustment can be precisely detected according to the pulse signals of the photo interrupter to decrease the risk of out-of-step or colliding with mechanical limits as a result of backlash or optical detection errors. Besides, the arrangement of shading parts may vary according to actual demands to adjust positioning precision, a focus adjustment range for an optical lens, or a moving trace of a kinetic machine part.

Figure 6:
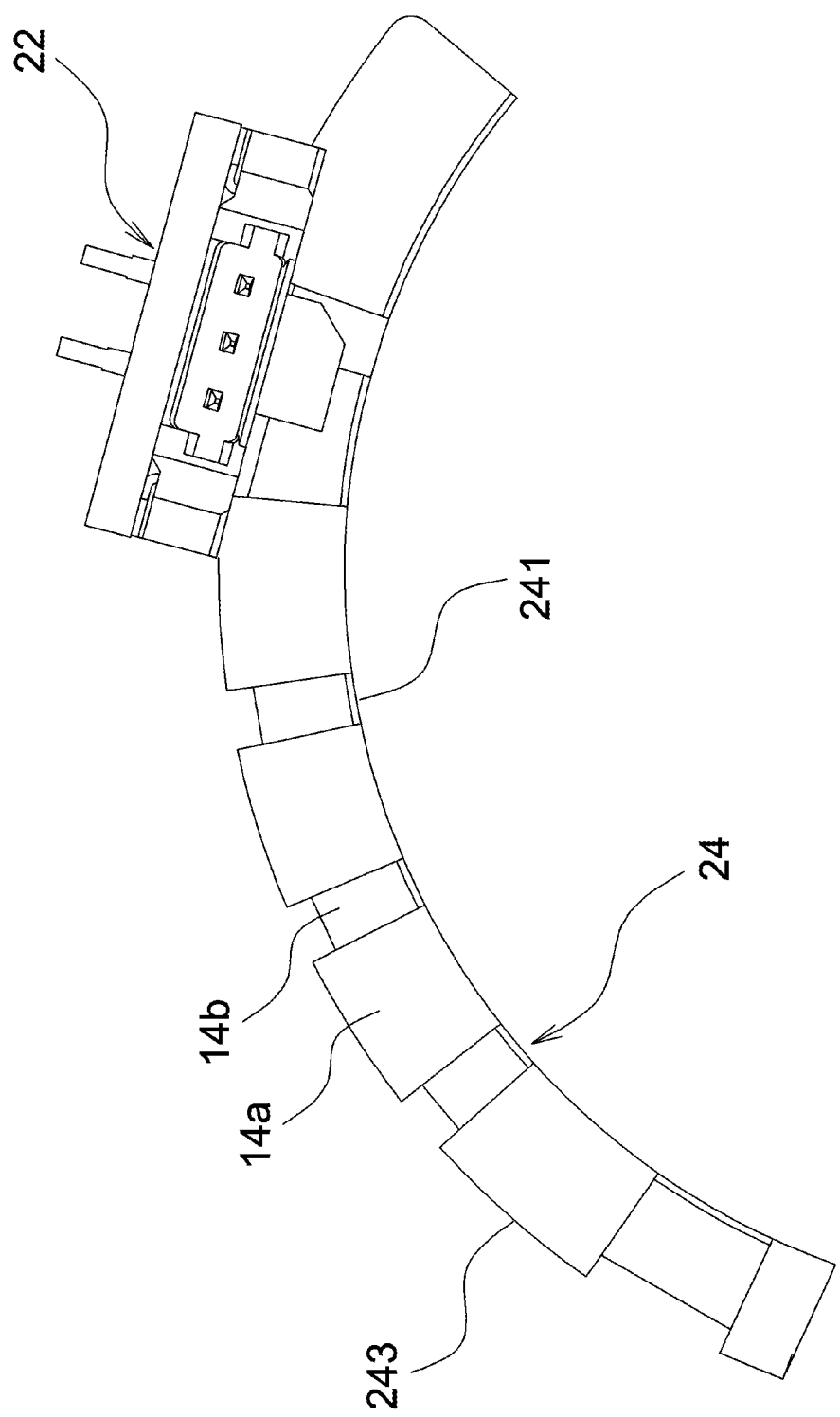
FIG. 6 shows a schematic diagram of a light-shading sheet according to another embodiment of the invention.

FIG. 6 shows a schematic diagram of an optical lens according to another embodiment of the invention. Referring to FIG. 6, the light-shading sheet 24 includes a sheet member 241 and multiple inserts 243 fit and arranged on the sheet member 241. In this embodiment, the shading part 14a having a comparatively longer length is formed in a position of the sheet member 241 provided with the inserts 243, and the shading part 14b having a comparatively shorter length is formed in a position of the light-shading sheet 14 without the inserts 243. In this embodiment, the light beam I impinging upon the shading part 14a having a longer length forms a light-blocking state, and the light beam I impinging upon the shading part 14b having a shorter length forms a light-transmitting state. The inserts 243 can be easily put on and detached from the sheet member 241 and thus are favorable for the adjustment of dimensions and intervals of the shading parts 14a and 14b and interrupt time of the photo interrupter 12.

Note the light-shading sheet 14 is not limited to a specific shape. In one embodiment, the light-shading sheet 14 may have an arc shape to correspond to the circumference of the lens barrel 11, and a rotational range of the light-shading sheet 14 or a focus adjustment range for the optical lens 10 may be any range selected from 0-360 degrees. In one embodiment, the light-shading sheet 14 may be formed from metal or plastic. In one embodiment, the light-shading sheet 14 may be made of a single sheet metal piece having multiple openings or a combination of multiple sheet metal pieces. In one embodiment, the photo interrupter 12 may be fixed, and the light-shading sheet 14 may move along with the lens group 16. Alternatively, the light-shading sheet 14 may be fixed, and the photo interrupter 12 may move along with lens group 16. In one embodiment, the power machine 17 may be a stepper motor or a voice coil motor, and the kinetic machine part 18 may be a threaded rod or a gear, but the invention is not limited there to.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens, comprising:
   a lens barrel;
   a first lens group disposed in the lens barrel;
   a photo interrupter disposed in the lens barrel and having an optical transmitter and an optical receiver, the optical transmitter emitting a light beam in a first direction, and the optical receiver receiving the light beam;
   a light-shading sheet disposed in a propagation path of the light beam and having two shading parts with mutually different lengths; and
   a power machine linked to a kinetic machine part, and the kinetic machine part being connected to the first lens group.

2. The optical lens as claimed in claim 1, wherein each of the different lengths is measured in a direction substantially perpendicular to a tangential motion direction of the light-shading sheet.

3. The optical lens as claimed in claim 1, further comprising a processor electrically connected to the photo interrupter, wherein the photo interrupter receives the light beam to output a first signal, and the processor receives the first signal to detect a current position of the first lens group.

4. The optical lens as claimed in claim 3, wherein the processor receives an initialization command to decide a moving direction of the first lens group.

5. The optical lens as claimed in claim 3, further comprising:
   a power machine driver electrically connected to the power machine, wherein the power machine driver receives a control command from the processor and output a second signal, the power machine receives the second signal of the power machine driver to move the first lens group by the kinetic machine part.

6. The optical lens as claimed in claim 1, wherein the power machine is a stepper motor or a voice coil motor.

7. The optical lens as claimed in claim 1, wherein the kinetic machine part is a threaded rod or a gear.

8. The optical lens as claimed in claim 1, wherein the light-shading sheet has a plurality of openings, and the two shading parts are distinguished from each other by the formation of the plurality of openings.

9. The optical lens as claimed in claim 8, wherein the plurality of openings comprises a first opening, multiple second openings and a third opening, the second openings are disposed between the first opening and the third opening, the configuration of each of the first opening and the third opening is different to the configuration of the second openings, and the first opening and the third opening have an identical configuration.

10. The optical lens as claimed in claim 1, wherein the light-shading sheet comprises a sheet member and a plurality of inserts fit and arranged on the sheet member.

11. An optical lens, comprising:
    a lens barrel;
    a first lens group disposed in the lens barrel;
    a waveform generator for generating a first pulse signal and a second pulse signal, a pulse width of the second pulse signal being smaller than a pulse width of the first pulse signal;
    a processor electrically connected to the waveform generator and receiving the first pulse signal and the second pulse signal of the waveform generator to detect a current position of the first lens group; and
    a power machine for moving the first lens group.

12. The optical lens as claimed in claim 11, wherein the processor receives an initialization command to decide a moving direction of the first lens group.

13. The optical lens as claimed in claim 11, further comprising:
    a power machine driver electrically connected to the power machine, wherein the power machine driver receives a control command from the processor and output a signal, the power machine receives the signal of the power machine driver to move the first lens group.

14. The optical lens as claimed in claim 11, wherein the power machine moves the first lens group by means of a kinetic machine part, and the kinetic machine part is a threaded rod or a gear.

15. The optical lens as claimed in claim 11, wherein the first pulse signal and the second pulse signal are generated through a motion of a light-shading sheet crossing the waveform generator.

16. The optical lens as claimed in claim 15, wherein the light-shading sheet has two shading parts with mutually different lengths, and each of the different lengths is measured in a direction substantially perpendicular to a tangential motion direction of the light-shading sheet.

17. The optical lens as claimed in claim 15, wherein the light-shading sheet has a plurality of openings, and the two shading parts are distinguished from each other by the formation of the plurality of openings.

18. The optical lens as claimed in claim 15, wherein the light-shading sheet comprises a sheet member and a plurality of inserts fit and arranged on the sheet member.

19. A fabrication method of an optical lens, comprising:

providing a lens barrel;

placing and fixing a lens group inside the lens barrel; and attaching a light-shading sheet and a photo interrupter to the lens barrel, wherein a plurality of pulse signals with different pulse widths are generated by a relative motion between the light-shading sheet and the photo interrupter, and the light-shading sheet has two shading parts with mutually different lengths.

20. The fabrication method as claimed in claim 19, wherein the photo interrupter is fixed and the light-shading sheet moves along with the lens group, or the light-shading sheet is fixed and the photo interrupter moves along with lens group.

* * * * *